United States Patent [19]

Nack, Jr.

[11] 4,023,854
[45] May 17, 1977

[54] VISOR

[76] Inventor: Frank Nack, Jr., 4314 Carson Road, St. Louis, Mo. 63121

[22] Filed: Sept. 24, 1975

[21] Appl. No.: 616,494

[52] U.S. Cl. .................................. 296/97 C; 24/258
[51] Int. Cl.² .......................................... B60J 3/00
[58] Field of Search ............ 296/97 C, 97 D, 97 H, 296/97 K; 24/250 R, 258

[56] References Cited

UNITED STATES PATENTS

| | | | |
|---|---|---|---|
| 1,080,336 | 12/1913 | Gammelgaard | 24/258 |
| 1,228,341 | 5/1917 | Maynard | 296/97 C |
| 1,871,461 | 8/1932 | More | 296/97 C |
| 1,958,934 | 5/1934 | Williams | 296/97 C |
| 2,223,957 | 12/1940 | Hillier | 24/258 |
| 2,267,331 | 12/1941 | Guvot | 24/258 |
| 2,863,202 | 12/1958 | Hanna | 24/258 |

*Primary Examiner*—Joseph F. Peters, Jr.
*Assistant Examiner*—John A. Carroll
*Attorney, Agent, or Firm*—Rogers, Eilers & Howell

[57] ABSTRACT

A transparent automobile anti-glare visor comprising a sheet of tinted and/or polarized plastic, generally rigid, clamps to secure the sheet pivotally and removably to the conventional opaque sun visor, and connecting devices to join the transparent sheet to the clamps. The clamps are one-piece U-shaped springy material, engagable on the edge of the conventional sun visor, with one tongue struck forwardly from one leg to press against the conventional visor, and bearings and a second tongue struck from the other leg so that a round rod can enter the bearings and be pressed upon by the second tongue, to restrain pivoting of the rod. The connecting devices may be integrally molded with the transparent visor, or may be separately formed with bifurcated body parts that straddle the edges and are connected to the plastic sheet. In either case, they provide the integral round rods that enter the bearings of the clamps. Flats on the rods provide greater stability in at least one position of adjustment. Radial extensions on the rod ends limit inadvertent withdrawal of the clamps from the rods.

7 Claims, 5 Drawing Figures

U.S. Patent  May 17, 1977  4,023,854
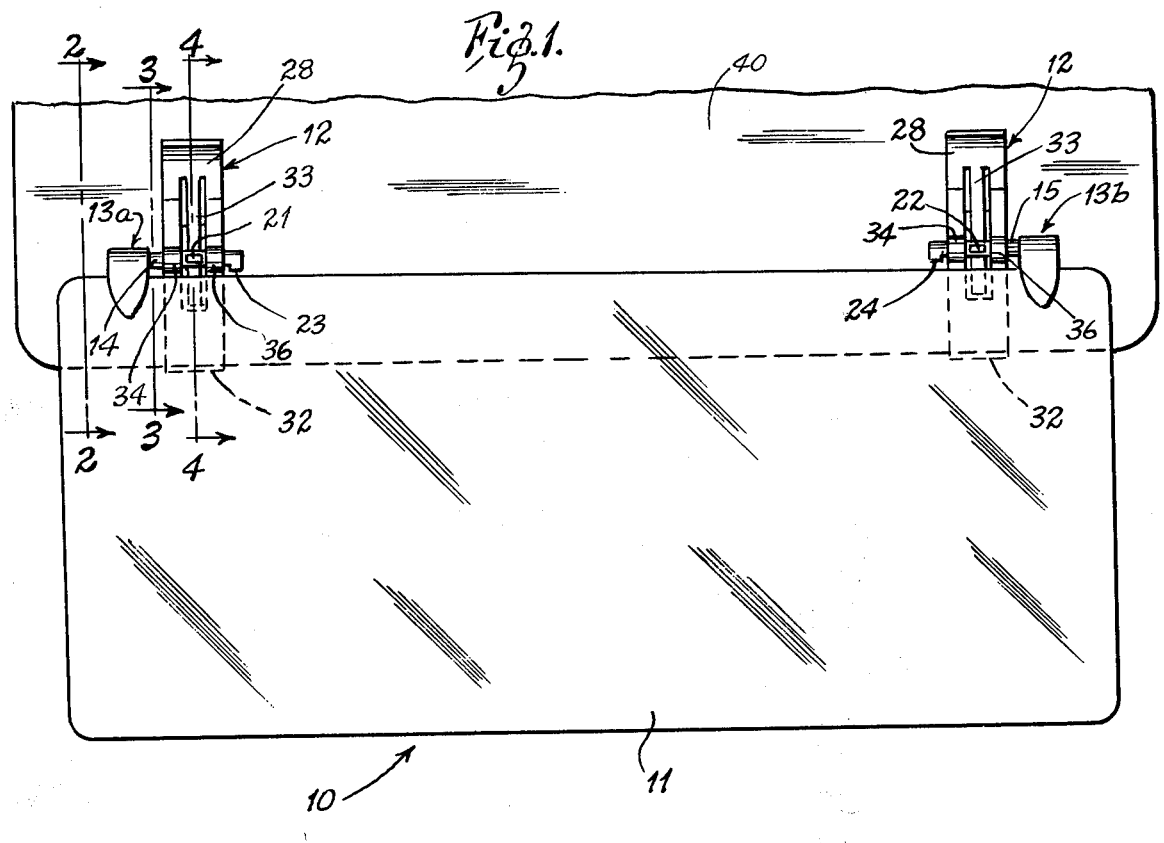
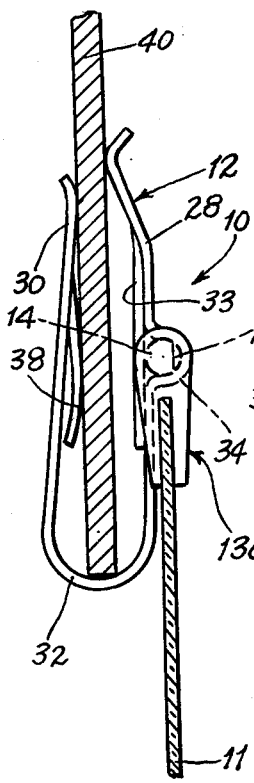 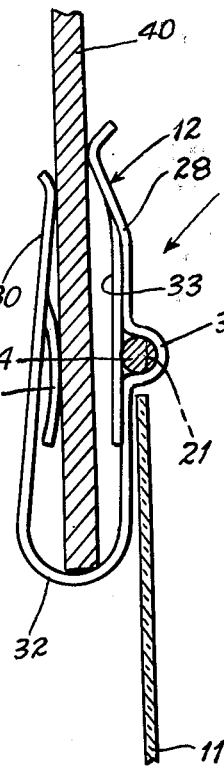 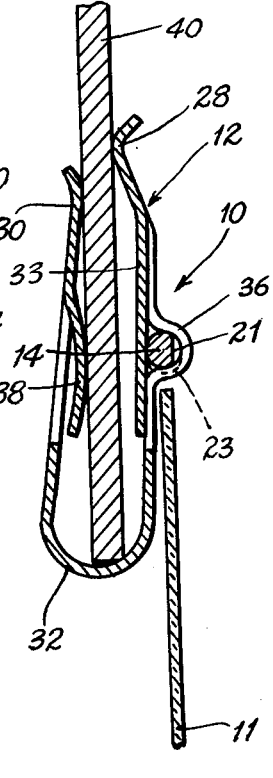 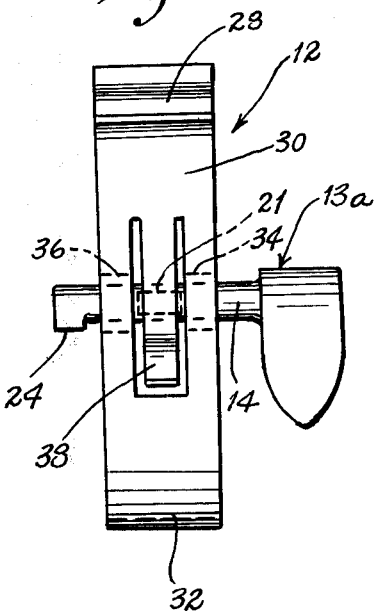

VISOR

BACKGROUND OF THE INVENTION

The invention is concerned with transparent antiglare visors which are attachable to standard opaque sun visors found in automobiles or other vehicles Various types of glare visors are known in the prior art. Prior art devices have unnecessary components and structure which make their operation less than convenient and add to manufacturing costs, such as long rod extending across the top of the visor, bulky and complex clamps for attaching the visor shield to the conventional visor, or penetrations through the transparent shield. Prior art devices also lack a simple structure which prevents a transparent visor in the raised or inoperative position from falling suddenly in the view of a driver.

SUMMARY OF THE INVENTION

The present device has advantages over the prior art. The transparent glare visor shield is attached to each of a pair of clamps by means of short arms which are connected to the shield. These arms can be made of Plexiglas or other rigid plastic material. The arms can be molded wih the transparent shield so as to be integral with it. As an alternative, the body of the arm section can be separate from the transparent shield, and slotted so as to receive the edge of the transparent shield. It can then be attached to the transparent shield as by epoxy glue. There is not need for any other fastening device. Thus, in either case, simplicity in design and manufacturing is achieved. The arms extending from the visor shield have knobs on their ends to prevent inadvertent removal of the arms from the clamps. Thus, there is no need for a long rod running the width of the visor shield at the top of the visor as known in prior art devices.

The present device incorporates a clamp which can be stamped from a single piece of springy material such as metal. Being one unit, it is simple to manufacture the clamp and to assemble it with the visor shield. Each clamp is "U" shaped, has two spring tongue prongs, one of which extends inwardly from one leg of the clamp and provides strong attachment to the opaque sun visor. The second prong extends from the other leg of the clamp and acts with two bearings of the clamp and the knob on the connecting arm to prevent inadvertent detachment of the visor arm from the clamp. This second spring prong holds the visor securely, but yet permits rotation of the visor relative to the clamp. The two prongs and the two bearings can be formed in the clamp by one stamping operation.

The visor shield can be rotated by hand operation to the desired position but will remain in place after that position has been attained by virtue of the spring pressure of the second prong. The shield with clamp can be detached from the opaque visor with ease by hand removal. The simplicity of the design of the present invention reduces manufacturing costs and allows ease of operation not present in prior art devices.

DESCRIPTION OF THE DRAWINGS

FIG. 1 is a front elevation of the invention from the drawer's side seen attached to an opaque automobile sun visor;

FIG. 2 is an end sectional view taken on line 2—2 of FIG. 1;

FIG. 3 is an end sectional view taken on the line 3—3 of FIG. 1;

FIG. 4 is an end sectional view taken on the line 4—4 of FIG. 1; and

FIG. 5 is a front elevation of the clamp and arm attachment of the invention.

DETAILED DESCRIPTION OF A PREFERRED EMBODIMENT

FIG. 1 generally indicates the present invention at 10. The invention comprises a tinted tansparent shield, 11, which can be made of a rigid plastic material such as Plexiglas, pivotally connected to clips 12 by hatched shaped connecting devices 13a and 13b. The devices 13a and 13b are likewise made of a rigid plastic material and are integrally molded with shield 11. The connecting devices 13a and 13b comprise cylindrical rods 14 and 15, respectively, which extend laterally. As is obvious, the connecting devices 13a and 13b can be separate from shield 11 and can have slots in their bottom sections, which can receive and fit snugly around the top edge of the shield 11. The shield 11 can be held in the slot of the connecting devices by a strong adhering substance such as epoxy glue. The connecting devices can also be "L" shaped metal pieces attachable to the shield 11 as by pins and eyelets.

The aforementioned cylindrical rods 14 and 15 can have aligned flats 21 and 22 respectively. The rods 14 and 15 can also be cylindrical without flats. At the outer ends of rods 14 and 15 are outwardly extending knobs 23 and 24 respectively. As is obvious, if it is desirous to make connecting parts 13a and 13b out of the same mold in the case when they are separate from shield 11, each connecting device could have two flats rather than one, the second flat being opposite and parallel to the first flat. Connecting device 13a would then be identical to and interchangeable with connecting device 13b.

The cylindrical rods 14 and 15 are pivotally attached to the clamps 12. Each clamp 12, as shown specifically in FIG. 2, 3, 4 and 5 is stamped from a single strip of somewhat resilient steel, formed into U-shape to provide a front leg 28 and a back leg 30 connected by a rounded bright portion 32. The front leg is cut out by the stamping to provide a tongue 33 besides which are two connecting legs. The legs are formed with rounded offsets 34 and 36 to receive the cylindrical rods 14 and 15. Between these two offsets 34 and 36 the spring tongue or prong 33 presses against the rods 14 and 15 and forces them against the interior of the two offsets with sufficient force to hold the rods 14 and 15 against the inadvertent rotation.

The knobs 23 and 24 are normally disposed alongside the offset 34 and 36 so that they can engage the offset and prevent the inadvertent removal of the arms from the clamp 12 if the clamps are slid towards the ends of the arms.

The back leg 30 of the clamp 12 is also formed with a spring arm 38 that normally projects downwardly from the front end of the leg 30 and inwardly from that leg toward the front leg 28. The ends of the legs 30 and 28 of the clamp are bent outwardly for ease of application of the clamps to a visor 40. The spring tongue 38 is curved to facilitate installation and removal of clamps. When the transparent visor 11 is in down position to depend from and approximately parallel to the opaque visor 40, the rods 14 and 15 are pressed by prongs 33 toward the interior of the offsets. When the visor 11 is rotated to the up position, the flats 21 and 22 of connecting devices 13a and 13b respectively, are pressed against the flat surfaces of the prongs 33 of the two clamps.

OPERATION

The glare visor apparatus is first assembled by inserting the arms 14 and 15 through the offsets 34 and 36 of the clamps 12. This is done for each clamp by pressing the spring prong 33 with a thumb or finger away from the offsets 34 and 36, allowing the knobs 23 and 24 to clear the offsets and the spring tongue 33. After the knobs 23 and 24 have cleared, the prongs 33 are released and press against the arms 14 and 15, forcing the arms against the interior of the offsets 34 and 36. They are prevented from inadvertent removal by the knobs 23 and 24.

The clamps 12 are then attached to the opaque visor 40 by sliding the leg of the clamps on the opposite faces of the opaque visor so that the free ends of the clamps and the spring prong 36 grip against the visor 40, the prongs 36 forcing the visor 40 against the front legs 28 of the clamps, thus holding the clamps 12 and visor 11 securely to the visor 40.

In a storage position, the transparent visor 11 is folded upwardly along side the rear face of the opaque visor 40. When this rotation occurs, the flats 21 and 22 of arms 14 and 15 respectively are rotated 180° relative to the clamps 12 so that the spring arms 33 press against those flats. This provides a releasable lock which prevents the inadvertent dropping of visor 11 in front of the driver which might startle him. To again rotate the visor 11 into operable positions, it is only necessary to rotate the visor 11 downward by force of the hand so that the flats 21 and 22 are rotated away from the spring finger 33 and can be pulled easily downward so that the visor 11 is in the viewing field of the driver. In downward position visor 11 then obstructs intense rays of light which come from the sun and create difficulty and inconvenience for drivers.

The visor 11 can also be rotated varying degress upwardly from the vertical downward position if the driver desires. The visor 11 will hold in the position selected because of the pressure of the spring prong 33 against the arms 14 and 15. If the standard opaque visor 40 is rotatably adjustable, numerous combinations of positions of the two visors are possible, which permits the driver to make adjustments to suit his viewing needs.

The transparent visor 11 can be easily removed from the opaque visor 40 by forcing the clamps 12 downward with a hand so that the clamps slide away from the opaque visor 40. The visor apparatus can be placed in travel compartment when not in use. As it is made of durably uncomplicated parts, it may be stored in a travel compartment without fear of its being harmed. Its small size makes it easy to store.

To remove the clamps 12 from the arms 14 and 15, the prongs 33 are pressed inward away from the arms so as to permit clearance of the knobs 23 and 24. With clearance for the knobs 23 and 24 being provided, the arms 14 and 15 can be pulled through the offsets 34 and 36 with ease, causing the separation of the clamps from the arms. Removal of the clamps would thus allow even simpler storage.

Various changes and modifications may be made within this invention as will be readily apparent to those skilled in the art. Such changes and modifications are within the scope and teaching of this invention as defined by the claims appended hereto.

What is claimed is:

1. In a glare visor attachable to a conventional automobile sun visor or the like : a glare-reducing transparent sheet, at least one connecting device, and at least one clamp for attaching the sheet to the visor; the connecting device having a first portion secured to the sheet and extending beyond the edge thereof, and having a swivel part projecting laterally from the part of the first portion that extends beyond the edge of the sheet, with a rounded portion forming a swivel portion, the clamp being of generally U-shaped springy material with two legs that can yieldingly engage opposite sides of a sun visor to hold the clamp thereon, a first tongue formed integrally with and projecting from one leg toward the other to apply force against the visor between the legs, a bearing formed in the other leg to pivotally receive the rounded portion of the connecting member, and a second tongue formed integrally with and projecting from the said other leg to engage the rounded portion and urge it into engagement with the bearing.

2. The structure of claim 1 wherein the connecting device is integrally molded with the transparent sheet, the connecting device and transparent sheet being made of a plastic-type material.

3. The structure of claim 1 wherein the connecting device is separate from the sheet, and has a slotted body which is adapted to receive the edge of the transparent sheet.

4. The structure in claim 1 wherein there are at least two connecting devices and two clamps.

5. The structure of claim 1 wherein the swivel portion of the connecting device has non-circular portions engageable with the tongue to provide detention of the glare sheet in a selected swivel position.

6. The structure in claim 1 wherein the laterally projecting part of the connecting device has a radial extension engageable with the U-shaped clamp to prevent inadvertent withdrawal of the swivel portion from the clamp.

7. In a glare visor attachable to a conventional automobile sun visor or the like: a glare reducing transparent sheet, two connecting devices, two clamps for attaching the sheet to the visor; each connecting device being adapted to be secured to the sheet, and having a part projecting laterally with a rounded portion forming a swivel part, a radial extension projecting from the rounded portion the radial extension having means for connecting it to the sheet; each clamp being of generally U-shaped springy material with two legs that can yieldingly engage opposite sides of a sun visor to hold the clamp thereon, a first tongue integral with and projecting from one leg near its center toward the other to apply force against the visor, a bearing integrally formed as two rounded humps in the other leg to pivotally receive the rounded portion of the connecting member, and a second tongue formed integrally with and near the center of the said other leg to engage the rounded portion and urge it into engagement with the bearing.

* * * * *